United States Patent Office 2,772,190
Patented Nov. 27, 1956

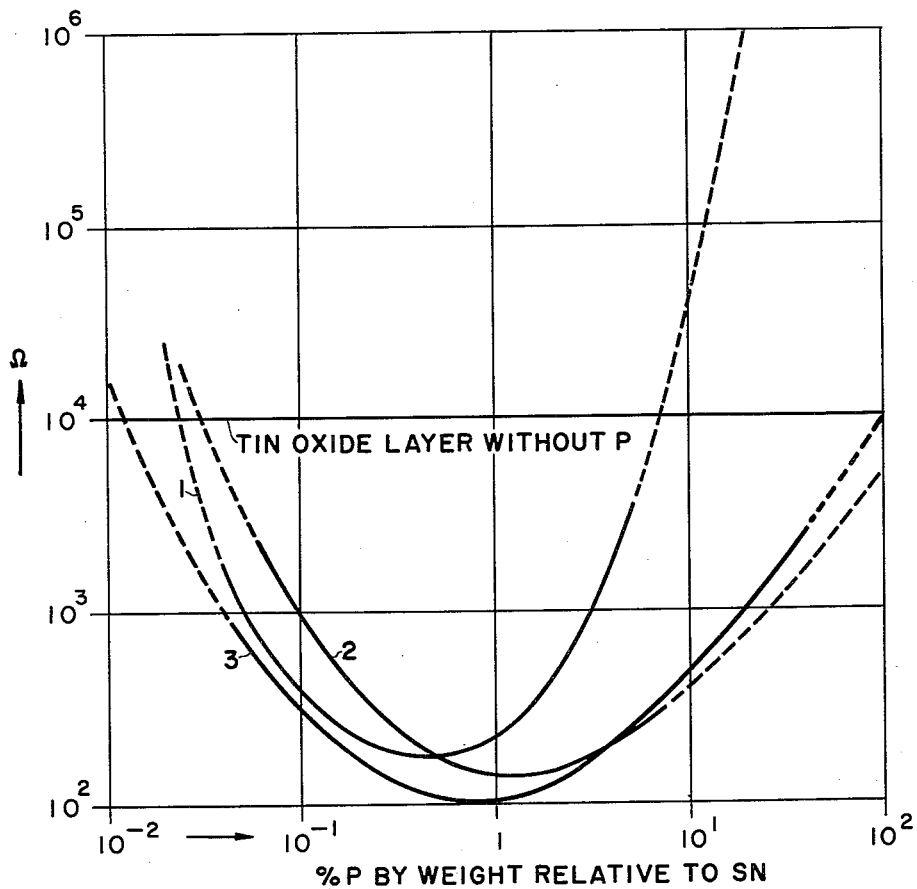

2,772,190

METHOD OF INCREASING THE ELECTRICAL CONDUCTIVITY OF TIN OXIDE FILMS

Pieter Willem Haayman, Petrus Cornelis van der Linden, Dirk Veeneman and Gerardus Hendricus Janssen, Eindhoven, Netherlands, assignors to Hartford National Bank and Trust Company, Hartford, Conn., as trustee Application September 25, 1952, Serial No. 311,524

Claims priority, application Netherlands November 3, 1951

9 Claims. (Cl. 117—211)

This invention relates to articles consisting of inorganic, insulating, heat-resistant material comprising an electrically conductive layer. In the present context, the term "heat-resistant material" is to be understood to mean a material which does not melt or soften at temperatures below 300° C.

It is known that electrically conductive layers can be formed on such materials by means of tin salts by providing the latter on the heated articles, thus producing layers of tin oxide. To this end both solutions in water and in organic solvents have been used and, as an alternative, reducing agents have been added to promote partial reduction of tin oxide required for conduction. The said conductive layers can be obtained by spraying articles with or immersing them in the said solutions and furthermore by coating them, by vaporisation, with volatile hydrolysable tin compounds.

The aforesaid known methods have a limitation in that the conductivity of the layers is chiefly determined by their thickness. Owing to this fact these known methods yield only low values of resistance with reduced transparency due to the greater thickness of the layer. In this way a resistance below a few hundreds of ohms for a square surface is not realisable without the transparency becoming insufficient when employing such layers for heating panes, for example for aircraft and automobiles.

According to a further suggestion the aforesaid difficulty is obviated by using hydrolysable tin salts in combination with antimony compounds. The antimony content permits the resistance value of the layer to be controlled, while for obtaining a low resistance the thickness of the layer need no longer be raised to a degree at which the transparency is insufficient.

According to the invention the articles consisting of inorganic, insulating, heat-resistant material are furnished with an electrically conductive coat containing tin oxide and phosphorus. The phosphorus content permits, in respect to the ratio between resistance value and transparency and also with respect to reproducibility of the resistance, results to be obtained which are equivalent to those secured by adding antimony.

The conductive layer is produced by applying a hydrolysable tin salt, to which a phosphorus compound has been added, to an article heated to at least 300° C. This may, for example, be effected by applying, by evaporisation, a mixture of a volatile tin salt and a phosphorus compound from a solution. Alternatively, the article may be immersed in a solution of the said compounds but preferably a solution is sprayed on to the heated article. The articles to be treated may, for example, consist of ceramic material, quartz or glass, preferably hard glass or hardened glass.

Similarly to known methods, tin halides and preferably tin tetrachloride particularly enter into account as tin salts.

According to the invention a wide variety of phosphorus compounds may be used. Besides $PCl_5$, $PCl_3$, $POCl_3$ or other phosphorus halides it is also possible to use phosphates, for example ammonium phosphate, and organic phosphoric esters, for example tricresyl phosphate, inasmuch as they are soluble in the tin salt solution. The concentration slightly depends on the nature of the chosen phosphorus compound and generally is between 0.1 and 25% by weight calculated over the tin salt. A lower content does not affect the conductivity and with a higher content the resistance increases steadily, 30% $PCl_3$ yielding for example a value of $10^6$ ohms for a square surface. Minimum resistance and maximum transparency are obtained with a content of phosphorus compound between 1 and 10% calculated over the tin salt. In respect of phosphorus chlorides in combination with tin tetrachloride the said optimum result is obtained with a content of 1 to 3%. The lowest amount of phosphorus relative to the weight of Sn that may be present according to our invention is the amount present when 0.1% by weight of $PCl_5$ is used relative to the tin salt which in this case is $SnCl_4$. The lowest amount of phosphorus by weight relative to Sn that we may use is therefore found from the following calculations:

$$\frac{\text{Atom wt P}}{\text{Mol wt PCl}_5} \times 100 = \text{percent } P = \frac{30.98}{208.27} \times 100 = 14.87\%$$

$$\frac{\text{Atom wt Sn}}{\text{Mol wt SnCl}_4} = \frac{118.70}{260.53} \times 100 = 45.5\%$$

Then, the percent by weight of phosphorus relative to tin equals $$\frac{\text{percent P}}{\text{percent Sn}} \times \text{percent by weight}$$

of the phosphorus compound relative to the tin compound. In the case of the minimum amount, this is $$\frac{14.87}{45.5} \times 0.1\% = 0.033\%$$

The largest amount of phosphorus relative to the weight of tin that may be present according to our invention is the amount present when 25% of $PCl_3$ is used relative to $SnCl_4$. The largest amount of phosphorus by weight relative to Sn that we may use is therefore found from the following calculations:

$$\frac{\text{Atom wt P}}{\text{Mol wt PCl}_3} \times 100 = \text{percent P}$$

$$= \frac{30.98}{137.35} \times 100 = 22.6\%$$

$$\frac{\text{Atom wt Sn}}{\text{Mol wt SnCl}_4} \times 100 = \text{percent Sn}$$

$$= \frac{118.70}{260.53} \times 100 = 45.5\%$$

and the percent by weight of phosphorus relative to tin there is therefore in this case $$\frac{22.6}{45.5} \times 25\% = 12.4\%$$

Thus, based on the tin content the percentage of phosphorus that may be added may vary from about 0.033% to about 12.4%.

Therefore, since optimum results are obtained when using from about 1% to about 3% by phosphorus chlorides by weight based on tin tetrachloride the optimum range of phosphorus by weight relative to tin that we may use may vary from about 0.33% to about 1.5%.

For producing the layer by immersion or spraying aqueous solutions may be used. Preferably, however, organic solvents are used, for example carbon tetrachloride and benzene, preferably ethyl acetate. In order to prevent premature hydrolysis with aqueous solutions the compounds are dissolved in a solvent containing hydrochloric acid.

By accurate control of the phosphorus content different resistance values are thus obtainable in a reproducible manner. The layers are capable of withstanding temperatures of approximately 500° C. in air without any appreciable influence on the resistance value, and are also excellent in mechanical respect.

Hence, the layers according to the invention are suitable for objects exposed to heat, for example domestic articles, laboratory receptacles and as electric resistances. In addition it is advantageous that the temperature coefficient is low at least at low resistance values. Furthermore, the layers may be used for carrying off static charges, for example in cathode-ray tubes and windows of electric measuring apparatus.

Since it is furthermore possible to attain resistance values of 100 ohms and lower for a square surface without the layer having to be made so thick as to cause the transparency to drop below 75%, the invention is of importance for glass plates capable of being heated, particularly for panes for autocars and aircraft. In the present context, the term "transparency" is to be understood to mean the percentage of incident light transmitted by the glass plate and the conductive layer after absorption and reflection.

For several of the aforesaid applications, particularly for domestic articles and heatable glass panes for vehicles, it may be of importance to furnish the conductive layer with an insulating layer, for example a layer of silicon lacquer.

In the case of heatable glass panes, the conductive layer may furthermore be covered with a second glass plate. If desired, a layer consisting of transparent plastic material may be sandwiched between the two glass plates in the manner usual for safety glass.

The conductive layers according to the invention may be provided with current supply contacts, for example, by vaporising or burning metal on to them. The invention will be described with reference to the accompanying drawing in which the sole figure shows curves showing the effects of the addition of phosphorus in combined form to a layer of tin oxide in lowering the resistivity thereof and with reference to the following examples.

In the following table a number of examples for explaining the invention is given of phosphorus containing tin chloride solutions sprayed on to hard glass heated to 650° C., the spraying operation taking place at a distance of about 30 cms. The solutions contained one part by weight of SnCl$_4$ to two parts by weight of solvent.

In the table are further stated the solvent, the phosphorus compound calculated as a percentage over SnCl$_4$, the quantity of liquid sprayed on to a surface of 100 cm.$^2$ and as an average of at least three measurements the value of the resistance for a square surface and the value of the transparency.

| No. | Solvent | Phosphorus compound | Percent Phosphorus relative to tin content | cm.$^3$ liquid | Resistance in Ω | Transparency in percent |
|---|---|---|---|---|---|---|
| 1 | ethyl acetate | 0.1% PCl$_3$ | 0.0495 | 5 | 1,500 | 85 |
| 2 | do | 1% PCl$_3$ | 0.495 | 5 | 100 | 80 |
| 3 | do | 3% PCl$_3$ | 1.48 | 5 | 225 | 81 |
| 4 | do | 6% PCl$_3$ | 2.96 | 5 | 450 | 82 |
| 5 | do | 10% PCl$_3$ | 4.95 | 5 | 1,650 | 85 |
| 6 | do | 0.1% PCl$_5$ | 0.033 | 5 | 300 | 82 |
| 7 | do | 1% PCl$_5$ | 0.327 | 5 | 100 | 80 |
| 8 | do | 3% PCl$_5$ | 0.98 | 5 | 60 | 80 |
| 9 | do | 6% PCl$_5$ | 1.96 | 5 | 120 | 80 |
| 10 | do | 1% PCl$_5$ | 0.327 | 10 | 50 | 80 |
| 11 | do | 3% PCl$_5$ | 0.98 | 50 | 12 | 76 |
| 12 | carbon tetrachloride | 1% PCl$_3$ | 0.495 | 5 | 200 | 81 |
| 13 | benzene | 6% POCl$_3$ | 2.66 | 5 | 350 | 82 |
| 14 | 1.9 p. by wght. of water + 0.3 p. by wght. 36% HCl. | 1% (NH$_4$)$_3$PO$_4$ | 0.457 | 5 | 125 | 81 |
| 15 | ethyl acetate | 1% tricresyl phosphate. | 0.179 | 5 | 400 | 82 |

When the liquid sprayed on contained one part by weight of SnCl$_4$ to two parts by weight of ethyl acetate but no phosphorus the resistance was 4000Ω.

The line in the upper part of the drawing with the legend shows the resistance of a tin oxide layer containing no phosphorus. This layer was applied to a substratum of glass by the technique hereinbefore described with the exception that the spray distance was 60 cm. instead of 30 cm. Curve 1 shows the effect of the addition of PCl$_3$ to the filming solution in lowering the resistivity of the tin oxide layer. Curve 2 shows the effect of the addition of PCl$_5$ to the filming solution in lowering the resistivity of the tin oxide layer. Curve 3 shows the effect of the addition of POCl$_3$ to the filming solution in lowering the resistivity of the tin oxide layer. In each instance, the addition of as little as 0.033% by weight of phosphorus relative to tin materially reduces the resistivity of the tin oxide layer which is 10,000 ohms per 100 cm.$^2$ without the addition of phosphorus.

What we claim is:

1. In a method of producing transparent electrically conducting films consisting substantially of tin oxide by applying a filming material in fluid form and which comprises an electrically-conducting film-forming compound of tin to a hot vitreous surface, heated to a temperature of at least 300° C.; the step of increasing the electrical conductivity of such films which comprises adding to said filming material, by putting into solution therewith, an amount of a compound of phosphorus to yield an amount of phosphorus not less than about 0.033% to not more than about 12.4% by weight of the tin in said filming material, before applying said filming material to said surface.

2. In a method of producing transparent electrically conducting films consisting substantially of tin oxide by applying a filming material in fluid form and which comprises an electrically-conducting film-forming compound of tin to a hot vitreous surface, heated to a temperature of at least 300° C.; the step of increasing the electrical conductivity of such films which comprises adding to said filming material, by putting into solution therewith, an amount of a compound of phosphorus to yield an amount of phosphorus not less than about 0.33% to not more than about 1.5% by weight of the tin in said filming material before applying said filming material to said surface.

3. The method of claim 2 in which the tin halide is tin tetrachloride.

4. The method of claim 2 in which the phosphorus is added in the form of a phosphorus halide.

5. The method of claim 2 in which the tin compound is tin tetrachloride, the phosphorus is added in the form of a phosphorus chloride and the solution contains an organic solvent.

6. The method of claim 2 in which the solution is applied by spraying.

7. An electrical resistance device which comprises a non-porous ceramic body having an electrically conducting transparent coating comprising primarily an oxide of tin and from not less than about 0.033% to not more than about 12.4% by weight of phosphorus in combined form relative to the tin in the coating.

8. An electrical resistance device which comprises a glass body having an electrically conducting transparent coating comprising primarily an oxide of tin and from not less than about 0.033% to not more than about 12.4% by weight of phosphorus in combined form relative to the tin in the coating.

9. An electrical resistance device which comprises a non-porous ceramic body having an electrically conducting transparent coating comprising primarily an oxide of tin and from not less than about 0.33% to not more than about 1.5% by weight of phosphorus in combined form relative to the tin in the coating.

References Cited in the file of this patent

UNITED STATES PATENTS

| | | |
|---|---|---|
| 2,490,825 | Mochel | Dec. 13, 1949 |
| 2,564,706 | Mochell | Aug. 21, 1951 |
| 2,692,836 | McAuley | Oct. 26, 1954 |